United States Patent
Saleeb et al.

[11] Patent Number: 5,972,395
[45] Date of Patent: Oct. 26, 1999

[54] METHOD OF PREPARING GLASS STABILIZED MATERIAL

[75] Inventors: Fouad Z. Saleeb, Plesantville, N.Y.; Vijay K. Arora, Montvale, N.J.

[73] Assignee: Kraft Foods, Inc., Northfield, Ill.

[21] Appl. No.: 08/843,080

[22] Filed: Apr. 25, 1997

[51] Int. Cl.$^6$ .................................................. A23L 1/22
[52] U.S. Cl. ........................... 426/96; 426/98; 426/534; 426/516; 426/650; 426/651
[58] Field of Search ............... 426/96, 534, 516, 426/650, 651, 98; 264/4, 4.4; 424/498

[56] References Cited

U.S. PATENT DOCUMENTS

| | | | |
|---|---|---|---|
| 2,809,895 | 10/1957 | Swisher | 426/651 X |
| 2,856,291 | 10/1958 | Schultz | 426/651 X |
| 2,857,281 | 10/1958 | Schultz et al. | 426/651 |
| 2,919,989 | 1/1960 | Schultz | 426/651 |
| 3,041,180 | 6/1962 | Swisher | 426/651 X |
| 3,314,803 | 4/1967 | Dane et al. | 426/651 |
| 3,554,768 | 1/1971 | Feldman | 99/140 |
| 3,704,137 | 11/1972 | Beck | 426/651 |
| 3,736,149 | 5/1973 | Knapp | 99/78 |
| 3,764,346 | 10/1973 | Noznick et al. | 426/213 |
| 3,914,439 | 10/1975 | Graves | 426/78 |
| 3,971,852 | 7/1976 | Brenner et al. | 426/103 |
| 3,985,910 | 10/1976 | Kirkpatrick | 426/572 |
| 4,004,039 | 1/1977 | Shoaf et al. | 426/548 |
| 4,232,047 | 11/1980 | Sair et al. | 426/96 |
| 4,289,794 | 9/1981 | Kleiner et al. | 426/660 |
| 4,448,789 | 5/1984 | Yang | 426/5 |
| 4,532,145 | 7/1985 | Saleeb et al. | 426/650 |
| 4,610,890 | 9/1986 | Miller et al. | 426/651 |
| 4,678,516 | 7/1987 | Alderman et al. | 106/197.1 |
| 4,689,235 | 8/1987 | Barnes et al. | 426/89 |
| 4,707,367 | 11/1987 | Miller et al. | 426/96 |
| 4,820,534 | 4/1989 | Saleeb et al. | 426/96 |
| 4,963,380 | 10/1990 | Schroeder et al. | 426/330.3 |
| 5,009,900 | 4/1991 | Levine et al. | 426/96 |
| 5,035,908 | 7/1991 | Arora et al. | 426/388 |
| 5,087,461 | 2/1992 | Levine et al. | 426/96 |
| 5,098,893 | 3/1992 | Franks et al. | 514/54 |
| 5,124,162 | 6/1992 | Boskovic et al. | 426/96 |
| 5,354,559 | 10/1994 | Morehouse | 424/488 |
| 5,399,368 | 3/1995 | Garwood et al. | 426/307 |
| 5,456,985 | 10/1995 | Zgoulli et al. | 428/402.2 |
| 5,506,353 | 4/1996 | Subramaniam | 536/103 |
| 5,601,865 | 2/1997 | Fulger et al. | 426/650 |
| 5,603,971 | 2/1997 | Porzio et al. | 426/96 |
| 5,786,017 | 7/1998 | Blake et al. | 426/534 |
| 5,792,505 | 8/1998 | Fulger et al. | 426/650 |

FOREIGN PATENT DOCUMENTS

| 9423593 | 10/1994 | WIPO . |
| 9611589 | 4/1996 | WIPO . |

*Primary Examiner*—Cynthia L. Nessler
*Attorney, Agent, or Firm*—Thomas R. Savoie; Thomas A. Marcoux

[57] ABSTRACT

The present invention provides a method for fixing and/or preserving labile materials, especially food materials, in an extruded glassy substrate. A minor component containing of a high molecular weight water-soluble polymeric carbohydrate is dry-blended with a major component comprising of a low molecular weight water-soluble carbohydrate, sugar alcohol or food acid. Typically, the carbohydrate admixture comprises between about 15% to 40% high molecular weight carbohydrate material and at least about 40% low molecular weight carbohydrate, sugar alcohols or adipic, malic or citric acids or combinations thereof. A labile material like omega-3 oils or β-carotene is combined with this substrate mixture. The dry-blended admixture is extruded so that the temperature of the material in the extruder is between about the glass transition state of the substrate and the melting point of the major ingredient. The free-flowing product is relatively non-hygroscopic and has a high fix.

10 Claims, 1 Drawing Sheet

METHOD OF PREPARING GLASS STABILIZED MATERIAL

TECHNICAL FIELD

The present invention generally relates to a method for fixing and preserving labile materials in a substrate, and more particularly to a low-temperature methodology for fixing labile materials in an extruded "carbohydrate-glass" substrate.

From their introduction, grocery goods have run the gamut from primitive canned vegetables to space-age dried and reconstitutable products. The problems attendant to dried foods and drink mixes are even more difficult to solve, since the drying process often drives off the essential oils and labile flavor constituents. The overwhelming problem has been to provide a taste that is flavorful and which mimics the freshly prepared product. Therefore, there have been many attempts to augment the flavor and color of both dried food products and drink mixes.

It has been found that one can present the consumer with a fresher tasting reconstitutable beverage mix, by adding certain natural labile compounds to improve a consumer's taste perception. Unlike liquid systems which usually retain flavorants without adverse stability problems, dry beverage and comestible mixes, are often patently unstable. Dry mixes do not retain labile flavorants and often present the consumer with a product lacking flavor or have off-flavors. Part of the problem is due to poor storage stability.

While food producers are covetous of fixing labile flavorants, the pharmaceutical industry is interested as well. For example, certain oils, when compounded into vitamins and supplements display their own peculiar stability problems. Alpha-omega fish oils display a marked propensity for generating objectionable off-flavors, compromised efficacy and off-odors upon storage. As the labile constituents oxidize and sublime into the headspace of the container an objectionable odor greets the consumer. Oxidation and degradation of the fish oil also generates off-flavors that are unacceptably distasteful to the consumer. Finally, oxidation and degradation affect the efficacy of the preparation with a marked decline.

The problems involved in the storage and utilization of labile materials furnish a series of parameters which must be adhered to. Whether the labile material is an essential oil or an omega oil, such as fish oil, or other air-oxidizable materials such as β-carotene, it is the substrate that is relied upon to retain the labile material. Unlike liquid systems, dry comestibles, pharmaceuticals and beverage mixes substrate constituents are exposed to the effects of extremes in heat, cold, during shipping and storage. Therefore, there has been a long-standing need for an encapsulation substrate which is food-approved, as well as, impervious to extremes of heat and cold. Additionally, it is desired to protect the comestible from extremes of light and moisture. Perhaps the most promising technique to solve the problems attendant to the fixation and preservation of labile materials is via encapsulation. One such method is by extrusion.

The prior art discloses a vast array of methodologies to preserve volatile flavors. The most rudimentary techniques provide flavor encapsulation techniques that merely furnishes dry forms of liquid flavors, for convenient handling and uniformity of strength. An empirical approach prevailed. With the increased assortment of products and escalating consumer demands for fresher tasting products of improved quality there was a long-standing need for improved methods for stabilizing flavorants. Hence, more sophisticated flavor encapsulation methods evolved to meet consumer demands. Initial efforts concentrated on the overall retention of flavor in relation to yield and the economics of the process. Later, more specific inquiries into retention of individual flavor notes and maintenance of the flavor profile gave rise to better methods of encapsulation. Only recently, have we begun to explore long-range stability, "fidelity" of an encapsulated flavor to its natural equivalent and its sensitivity to oxidation.

Early prior art discloses that encapsulation technology strived to furnish dry forms of labile materials, for the convenience of handling and uniformity of strength without close regard to the amount of labile material entrained. Again, an empirical approach prevailed. With the increased assortment of products and consumer demands, quality and better understanding of encapsulation of labile materials brought additional demands. Even then, the initial efforts concentrated on the overall retention of the labile material followed by the more specific inquiries into retention of individual flavor notes and maintenance of the flavor profile. However, these efforts focused almost exclusively on labile materials.

Given the extreme economic ramifications, there are only two technologies of commercial importance in encapsulating labile materials: spray drying and extrusion. Spray drying technology is less expensive than extrusion, but its product is of necessity more porous and thus more sensitive to the ingress of oxygen and mechanical damage. Moreover, spray drying does furnish a product of very fine particle size, suitable for quick and complete dissolution, and also having very fine and uniform droplet size of the labile material which provides for uniform distribution and delivery in the final product.

The most notable attempts to create dry products fixing or preserving labile materials are outlined as follows.

U.S. Pat. No. 2,856,291 and U.S. Pat. No. 2,857,281, issued to Schultz, disclose a method for incorporating a labile flavoring substance in a sugar substrate. A mixture of the sugar, flavor oil and water, is prepared and blended to form an emulsion and this emulsion is extruded, cooled and cut into rods. Among the flavoring materials used are flavor oils, such as orange oil and lemon oil and synthetic agents such as aldehydes, alcohols, esters, and other labile agents.

U.S. Pat. No. 2,809,895, to Swisher, describes a process for encapsulation of an essential oil, such as lemon, lime or grapefruit oils, in a matrix comprising corn syrups, antioxidant and a dispersing agent. The essential oil, antioxidant and dispersing agent are added to the corn syrup, the resultant mixture is heated to 85° to 125° C. and extruded to produce an emulsion in pellet form, and the resultant particles are washed with an essential oil solvent and dried under vacuum to remove the solvent.

U.S. Pat. No. 2,919,989, to Schultz, describes a modification of the process of the aforementioned U.S. Pat. No. 2,856,291, in which the sugar base used comprises, by weight, 15% to 40% sucrose, 10% to 50% lactose, 5% to 14% maltose, 10% to 50% dextrose and not more than 15% dextrin.

U.S. Pat. No. 3,041,180, to Swisher, describes an essential oil flavoring composition produced by mixing glycerol and 42 DE corn syrup solids into an aqueous, semiplastic mass, which is then combined with the essential oil by means of an emulsifier. The resulting mixture is extruded into a cold solvent to form an extruded solid in which the essential oil is encapsulated by the glycerol and corn syrup solids. This extruded solid is then dried and an anti-caking agent added to produce an extruded particulate solid having an extended shelf life.

U.S. Pat. No. 3,704,137, to Beck, describes an essential oil composition formed by mixing oil with an antioxidant, separately mixing water, sucrose and hydrolyzed cereal solids (dextrose equivalent (DE) substantially below 29, and preferably between 10 and 15), emulsifying the two mixtures together, extruding the resultant mixture in the form of rods into a solvent, removing excess solvent and finally adding an anti-caking agent, preferably silica.

U.S. Pat. No. 3,971,852, to Brenner, et al., describes a process for encapsulating an oil in a matrix comprising a polysaccharide (which may be dextrinized starch or hydrolyzed starch having a DE of 10 to 25) and a polyhydroxy material, which can be glucose, maltose or fructose. The ingredients are emulsified and spray dried.

U.S. Pat. Nos. 4,610,890 and 4,707,367, to Miller, et al., describe a process for preparing a solid essential oil composition having a high content of the essential oil. This composition is prepared by forming an aqueous solution in a closed vessel under controlled pressure conditions to form a homogeneous melt, which is then extruded into a relatively cold solvent, dried and combined with an anticaking agent.

U.S. Pat. No. 4,689,235, to Barnes, et al., describes a process which involves generally the same steps as in the aforementioned U.S. Pat. No. 4,610,890 but in which the solution used for encapsulation comprises a mixture of a maltodextrin and hydrogen octenyl butanedioate.

U.S. Pat. No. 3,314,803, issued to Dame, et al., provides a method for fixing a labile flavor such as acetaldehyde in a mannitol substrate. The acetaldehyde is fixed in mannitol by first forming a solution of mannitol and water and preferably a supersaturated solution of mannitol of between 25% to 45% by weight. The supersaturated solution is formed by heating with agitation 2 to 10 parts by weight of mannitol with 10 parts by weight of water at 180° F. to 212° F. (82° C. to 100° C.). Until all of the mannitol is dissolved in the water and no mannitol crystals remain in the solution. The solution is then cooled while acetaldehyde is added thereto. The reference solution is then spray dried.

In the prior art examples, the major disadvantages of using the above-enumerated compounds or methodologies include the low fix obtained therefrom, the risk of oxidation and degradation concurrent with the long mixing times, the inherent hygroscopicity of the resultant products, and the limitation that the materials are in liquid form. Stability of previously available products is in most cases dependent on a hermetically-sealed product environment, which is kept free from ambient moisture levels and from oxygen. It should be noted that most commercial products contain added antioxidants which must be added to prevent oxidation of the labile material fixed on the dry substrate.

Some improvement in stability was obtained by entraining labile flavorants in glassy carbohydrate substrates. In U.S. Pat. No. 4,820,534, issued to Saleeb, et al., discloses a method for fixing labile materials, such as essential oils in an extruded glass substrate using 10% to 30% low molecular weight carbohydrates and at least 70% high molecular weight material such as maltodextrin. Stable "fixes" are obtained from this somewhat expensive extrusion process. In a similar glass system, U.S. Pat. No. 5,009,900, issued to Levine, et al., reveals an extruded glassy matrix for labile materials comprising 40% to 80% chemically modified starch, 10% to 40% by weight maltodextrin, 5% to 20% by weight corn syrup solid or a polyglucose and 5% to 20% mono and disaccharide.

U.S. Pat. No. 4,532,145, issued to Saleeb, et al., provides a method of fixing labile materials, such as acetaldehyde in a spray dried amorphous substrate of 10% to 30% low molecular weight carbohydrate and at least 70% high molecular weight material such as maltodextrin. The fix in the lower weight spray dried product was better than using earlier carbohydrate systems but not as good as obtained by extrusion.

PCT Application No. PCT/IB94/00319 of Firmenich S. A. reports a process of fixing flavor oils in a mixture of mono- or disaccharide, a polysaccharide and water with a minor amount of a flavor oil which is extruded and has a $T_g$ below room temperature.

U.S. Pat. No. 5,456,985, issued to Zgoulli, et al. reports a means of enveloping an oily liquid such as fish oil in a particle made with an enteric coating polymer.

U.S. Pat. No. 4,963,380, issued to Schroeder, et al. provide a stable beverage containing nonhydrogenated fish oil stabilized with fructose.

In accordance with the prior art, some fixation media display a great degree of crystallinity. However, crystallinity appears to reduce the interstitial macro-molecular space wherein the labile material may be entrained and held. It has also been found that with an increase in crystallinity there is a concomitant decrease in the ability of the substrate to "fix" labile materials. An inability to "fix" labile materials suggests exposure to or reaction with oxygen. Lack of crystalline structure does not insure a good substrate for fixing labile materials. There are several classes of noncrystalline compounds which also appear to be unsuitable fixation media. Certain film forming gums such as gum arabic and waxy starches, result in "leaky" substrates with a concomitant minimized ability to fix the labile agent.

Many nutritionally useful compounds are susceptible to oxidation or reaction with atmospheric oxygen. In order to prevent this phenomena the labile material is often protected by the addition of synthetic or natural antioxidants such as BHA or mixed tocopherols. With the increased consumer awareness and vocal opposition against so-called chemical additives, preservative additives are seen as undesirable label ingredients. Therefore, it is possible to reason that the perfect "encapsulation procedure" would alleviate the need for any preservative whatsoever. By protectively sealing labile materials in a nonporous substrate one can prevent the oxidative effects and markedly prolong shelflife and efficacy.

SUMMARY OF THE INVENTION

The present invention provides a method for fixing a labile material in an extruded "carbohydrate-glass" substrate. In a preferred embodiment of the process in accordance with the present invention, one mixes major and minor components, melts this admixture, and homogeneously adds the labile material to the melt which thereafter becomes solid.

The major component of the substrate is a low molecular weight (between about 90 and 950 molecular weight), water-soluble ingredient that may be a carbohydrate, a sugar alcohol, a food-acid or combinations thereof. The carbohydrate may be a crystalline structure, and a monosaccharide, disaccharide, or trisaccharide. The major component is typically responsible for from about 40% to about 85% by weight of the substrate.

The minor component of the substrate is a material which contains about 90 to 100% high molecular weight of a polymeric carbohydrate material having a number average molecular weight above 1,000. Desirably, the minor component is from about 15% to 50%, by weight of the substrate mixture.

The major and minor components are preferably admixed or dry-blended with the labile material(s) that one wishes to encapsulate. Further thereto, it is desired that appreciably no moisture is added to the dry mix of components.

In the preferred method employed herein, the minor component is mixed with the major component of the admixture, as the admixture passes through an extruder. Desirably, the temperature within the extruder is regulated so that the temperature of the material in the extruder is from about the glass transition temperature of the substrate to the melting point of the major component to produce a uniform glassy structure after extrusion thereof.

The labile material as described herein is typically non-volatile and air-oxidizable. The labile material may be sensitive to oxygen, moisture and other food ingredients, etc. Examples include essential oils, vitamins and food ingredients possessing a structure of at least one double or triple bonded (carbon-carbon) group.

The stability of the labile material determines when the labile material is added to the major and minor components. For example, a relatively stable labile material like β-carotene can be added to the dry blend of the major and minor components upon the initiation of the process. On the other hand, a relatively unstable labile material should be added to the mixture by direct introduction into the extruder as a separate step. As a general rule, the labile material must be homogeneously distributed in the substrate matrix prior to the substrate materials entry into the extruder diehead, The resultant product of the major and minor components after leaving the extruder via the diehead and upon being cooled, is a hard, homogenous glass, with a final moisture content of approximately 3–6%. The product of the present invention has a glass transition temperature ($T_g$; as measured by a Differential Scanning Calorimetry, "DSC" of at least about 30° C., preferredly of at least about 45° C., and more preferredly of at least about 55° C. Additionally, it is preferred that the $T_g$ of the product of the present invention is less than about 65° C. The product in accordance with the present invention presents a labile substance essentially entrained or entrapped in a glass matrix.

In accordance herewith, good results have been found when the major component comprises at least about 50% of the substrate. For example, a series of preferred parameters includes (i) 80% by weight of maltose monohydrate and about 20% maltodextrin having a D.E. (dextrose equivalent) of about 10, and (ii) an extruder zonal temperatures at or below about 100° C. In this illustration, the extruder temperature is selected based on the melting point of maltose monohydrate, the major component, which is about 102°–103° C. It should be noted that the temperature of the materials may, for brief periods, of time exceed the melting point temperature of the major component without harmful results. The elevated temperature is due to the friction of the material flowing from the extruder through the diehead where friction and temperature increase markedly. Preferably, the glass transition temperature of the substrate mixture is less than the melting point of the low molecular weight ingredient (when pure).

The amount of labile material that can be fixed within the substrate of the product, in accordance with the present invention, depends upon the properties of the labile material as a solute/dispersant or as a plasticizer in the substrate glass. Typically, the glass substrate product can fix from between 0.1 and 18%, by weight, of the desired labile material, when the labile material is a liquid that is not miscible in the melted major component. More specifically, the product stabilizes between about 1 and 15%, by weight, when the labile material is a liquid that is not miscible in the melted major component. If the labile material is a liquid that can plasticize the substrate glass such as an alcohol or a compound with a carbonyl group such as acetone, desirably the product contains about 7%, or less, by weight, of the labile material. When the labile material is a plastizing liquid, it is preferred that the product contains between about 0.1 and 5%, by weight of the labile material. Typically, the amount of a solid that can be included in product of the present invention is between about 1 and 50%, by weight, and preferably between about 20 and 45%, by weight. If the labile material is a solid that can plasticize the substrate glass, then the substrate glass can hold an amount of the labile material that does not reduce the product's $T_g$ below about 30° C.

Upon exposure to ambient temperatures and humidities, the product of the present invention remains as a hard, glass structure while retaining the labile material(s) at levels dependent upon the type of labile material being fixed. The resultant fixed product exhibits little hygroscopicity, and is of high density after the extrudate is ground. The fact that the product exhibits low levels of hygroscopicity is desired in that the product remains moisture-stable and free-flowing without the addition of anti-caking agents.

The instant invention has several advantages over prior art methods. For example there is no requirement for: maintaining the admixture at high temperatures; using emulsifiers or employing glycerin-type plasticizers. Furthermore, the labile materials are dry-blended, obviating the need to introduce exogenous moisture and anti-caking agents.

DESCRIPTION OF THE PREFERRED EMBODIMENTS

Figure 1:
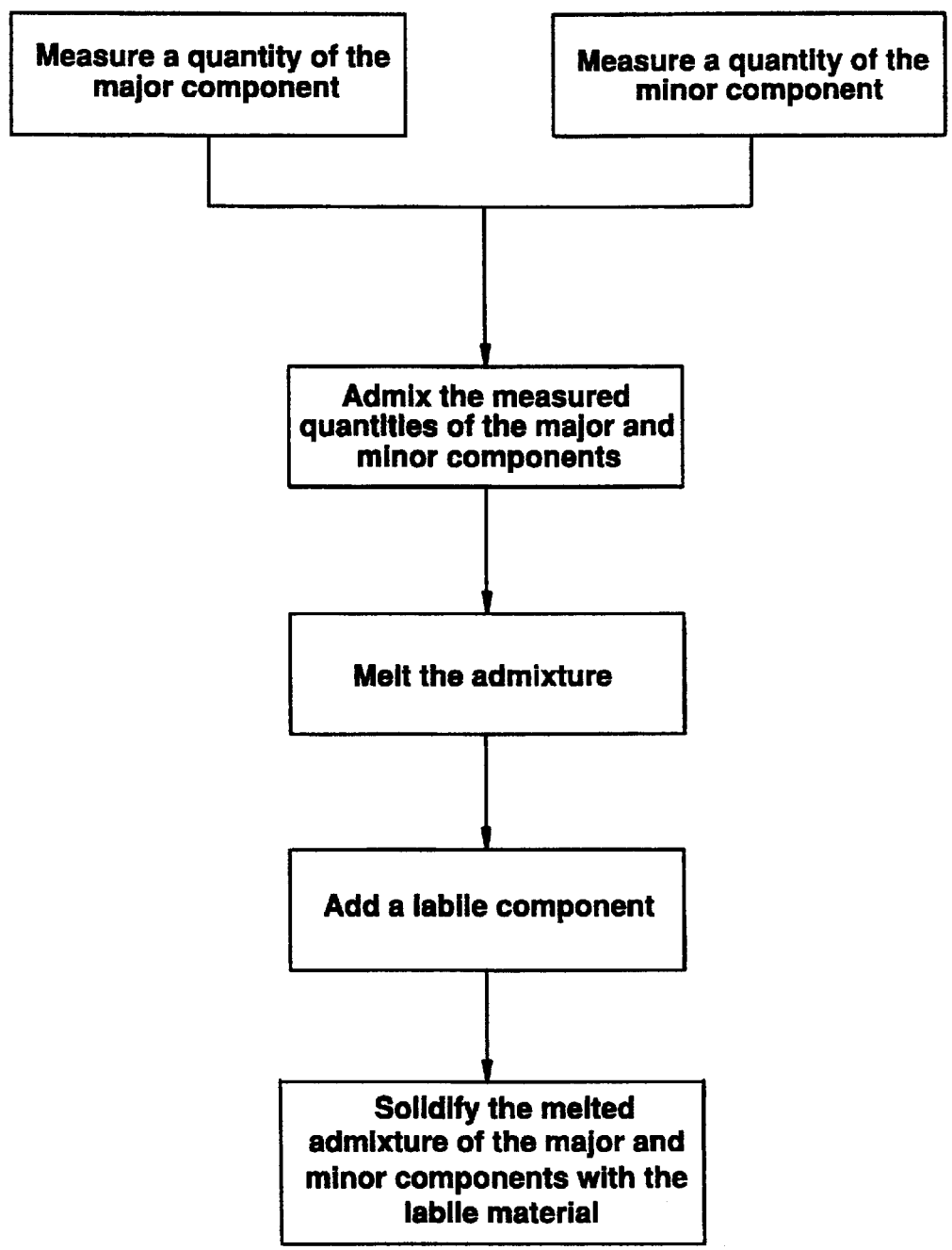
FIG. 1 is a schematic representation of the process of the present invention.

The present methodology, as illustrated in FIG. 1, includes the steps outlined hereinbelow, wherein the ingredients are dry-blended or admixed and then extruded. The extrusion is preferably undertaken with extruder temperatures which are set within a desired temperature range.

In a preferred embodiment, the substrate is comprised of a major component, comprising from about 40% to 85% by weight of the substrate, and a minor component, comprising from about 15% to 40% by weight of the substrate. In further preferred embodiment, the major component comprises between about 50 and 85% of the substrate admixture and the minor component comprises between about 15 and 30% of the substrate admixture. Notwithstanding these ranges, it is important in the actual practice of the present invention that the substrate admixture is not allowed to become too sticky (stickiness can be measured either by touch or observation).

In accordance with the preferred embodiment, the composition of the present invention includes between about 1 and 6 parts, by weight, of the major component for each part of the minor component. More preferably the composition should be from about 1.2 to about 6 parts, by weight, of the major component for each part of the minor component.

In accordance with the present invention it is preferred that the major component is a low molecular weight (between about 90 and 950 molecular weight, and preferredly between about 90 and 510 molecular weight) water-soluble material. Desirably, the major component has a melting point of between about 80° and 190° C. A low molecular weight carbohydrate like: glucose, maltose, maltotriose and mannose are particularly preferred. It is also desirable that if one uses sucrose, that the sucrose content of the substrate is less than about 5%, by weight.

Two classes of materials which may be operatively substituted for all or part of the low molecular weight carbohydrates are food-approved sugar alcohols and food-approved acids, as they display similar utility. For purposes of the present invention, food-approved sugar alcohols include xylitol, adonitol, arabinol, arabitol, sorbitol, mannitol, ducitol, alditol, and iditol and food-approved acids include adipic acid, citric acid and malic acid. If a food-approved acid is used, it is preferred that the food-approved acid is malic acid. Alternately, the aforementioned sugar alcohols and/or acids may be combined with the low molecular weight carbohydrate, to form the major component.

The minor component is preferably a water-soluble polymeric carbohydrate material containing predominately high molecular weight constituents. For example, the minor component may be a maltodextrin. The maltodextrin should typically possess less than about 10% mono-, di- and trisaccharides by weight, and preferably has a D.E. of from 5 D.E. to 20 D.E., with the preferred D.E. being about 10. LODEX® 10 from American Maize-Products Company is a useful maltodextrin in the practice of the present invention.

The present invention can fix a wide variety of labile materials, and protect the materials from degradative oxidation pursuant to introduction of air. Additionally, the present invention protects moisture sensitive materials from the introduction of moisture. Therefore, the instant substrate can protect a wide variety of essential oils and other labile substances. For example, the present invention can protect materials having carbon-carbon double bonds such as the essential fatty acids present in some nutritionally-useful polyunsaturated oils such as the omega oils. One class of nutritionally-useful oils is the fish oils. Other labile materials that can be protected by the present invention include vitamins and co-factors such as β-carotene. It has been found that the present invention can stabilize labile colorants and flavoring materials such as solid flavoring materials like maltol, menthol and vanallin.

The amount of labile material that can be stabilized in the product of the present invention depends upon the physical properties of the labile material. Materials which have been found to augment the process in accordance with the present invention may be characterized as materials that can function as part of the low molecular weight major component in the resultant substrate glass. For example, menthol and maltol have been found to function as part of the major component in accordance with the present invention.

Typically, the resultant substrate can stabilize from between 0.1 and 18%, by weight, when the labile material is a liquid that is not miscible in the melted major component. Preferably, the product stabilizes between about 1 and 15%, by weight, when the labile material is a liquid that is not miscible in the melted major component.

If the labile material is a liquid that can plasticize the substrate glass, such as an alcohol like ethanol and propanol or a compound with a carbonyl group such as acetone, desirably the product contains about 7%, or less, by weight, of the labile material. When the labile material is a plasticizing liquid, it is preferred that the product contains between about 0.1 and 5%, by weight, of the labile material.

Typically, the amount of a solid that can be included in the product of the present invention is between about 1% and 50%, by weight, and preferably between about 20% and 45%, by weight. If the labile material is a solid that can plasticize the substrate glass, then the substrate glass can hold an amount of the labile material sufficient to maintain the product's $T_g$ at about 30° C.

For purpose of the present invention, an illustrative combination of ingredients for use in the present invention is LODEX® 10 (a maltodextrin), high maltose corn syrup solids and fish oil. For example—an extruded admixture of 20 parts maltodextrin, 80 parts high maltose corn syrup solids and 10 parts fish oil stabilize the fish oil.

The minor and major components are dry-blended. The term dry-blended as used herein refers to mechanically mixing the components in the absence of added moisture, but recognizes that the substrate components and the labile materials may themselves contain small percentages of moisture (typically between about 2 and 6% water).

Preferably, the major component of the substrate is a low molecular weight (between about 90 and 950 molecular weight, more preferably between about 90 and 550 molecular weight), water-soluble ingredient that may be a carbohydrate, a sugar alcohol, a food-acid, functional equivalent, or combinations thereof. The carbohydrate may be a crystalline structure, and a monosaccharide, disaccharide, or trisaccharide. The major component is typically responsible for from about 40% to about 85% by weight of the substrate. It is preferred that the major component be high maltose corn syrup solids.

The minor component of the substrate is a material which contains about 90% high molecular weight of a polymeric carbohydrate material having an average molecular weight above 1,000. Desirably, the minor component is from about 15% to 40%, by weight of the substrate mixture. It is preferred that the minor component is maltodextrin.

The means of addition of the labile material depends upon the inherent stability of the labile material. More stable labile materials may be added to the mixing of the major and minor components before the dry-blended components are transferred to the extruder. However, highly oxidizable labile materials, such as fish oils, should be added to dry blended components once said components reside inside the extruder. Moreover, it is preferable that highly oxidizable materials be added to the extruder in an atmosphere substantially free of an oxidizing gas. Therefore such gases as nitrogen, carbon dioxide and helium may be operatively employed.

The dry-blended mixture is extruded while the extruder zones are set within a preferred temperature range. Although the type of extruder appears to be immaterial, for purposes of the present invention, a Brabender Extruder (manufactured by Brabender Corp., South Hackensack, N.J.) will be used for illustrative purposes. The Brabender extruder possesses a zonal temperature differential.

The desired temperature range is determined by calculating the glass transition state of the substrate and the melting point of the major ingredient. The extrusion should be carried out at a temperature which is from about the glass transition temperature of the substrate admixture but less than the melting point of the major component. The temperature of extrusion also depends upon the melting point of the major ingredient. Melting the major component is an important aspect of the process of the present invention. As the major component melts, the minor component will mix with the major component and form a solid solution. During this process, or slightly after, the labile material is dispersed within the molten mass, and upon cooling, a homogenous, glass with entrained labile material results. However, in order to maximize the amount of the labile material fixed within the glass product, it has been found that the set temperature of the extruder should be kept as low as possible. As a result, the temperature of the zones of the extruder, excluding the diehead zone, are set at or below about the melting point of the major ingredient. The set temperature of the extruder does not necessarily equal the actual temperature of the material in the extruder. The heat of friction, as the material passes through the diehead elevates the extrudate temperature. As a result the extruder temperature may be set below the melting point of the major ingredient, while the major ingredient still melts. The critical temperature range then is from about the glass transition state of the substrate to about the melting point of the major ingredient.

Typically, the components of the present invention have an extruder residence time in the order of about one half to one and a half minutes, preferredly the extruder residence time is between about 45 and 75 seconds.

Given the kinetics of the heat of friction as stated hereinabove, the diehead zone of the extruder must be treated separately. Although the same product goal applies, fixing the maximum amount of the labile material by optimizing the temperature, other factors come into play. The size of the die aperture plays a role in determining the extrudate temperature. As the size of the aperture decreases the heat of friction increases and the effect on the extruder temperature allows for decreasing extruder zone temperatures. As die size decreases, the possibility of the diehead clogging increases. For example, if the diehead aperture possesses a diameter of about at least 1 cm, then the temperature in the extruder may be as low as about 90° C., with a diehead temperature of about 90° C. By reducing the diehead aperture to a diameter of about 1 mm, the extrudate temperature at the diehead may reach about 113° C. It has been found that to facilitate the outflow of the extrudate it is sometimes necessary to increase the diehead temperature above the melt temperature of the major ingredient. It is believed that the short amount of time that the extrudate would be subjected to the elevated temperature of the diehead has only minimal effect on the labile materials, but in order to maximize the amount of labile material in the product, the diehead temperature should be set at the lowest possible temperature above the melting point of the major ingredient which does not result in the clogging of the diehead, preferably not more than about 10° C. above the melting point of said major ingredient.

It is preferred that the strands or sheets of the product of the present invention are cooled as they leave the extruder diehead. This cooling reduces the amount of fusing that can occur between strands or sheets of the product that touch prior to reaching an ambient temperature. One means of cooling these strands or sheets is by passing air, preferably cool air, over the product as it leaves the extruder. This cooling can be accomplished in some instances by directing a fan at the product.

As the labile material is homogeneously distributed in the glass matrix, some of the labile material is on the surface of the glass. However, this labile material on the surface is not stabilized, and it may have an aroma that is not desirable. To remove any potential odor from the labile material including any odor that might originate from the degradation of the labile material, it is desired that the product is washed before storage or other uses. For example, the product can be washed with volatile food grade solvents like isopropyl alcohol or hexane to remove any of the labile material on the surface of the glass product of the present invention.

While not necessary for the practice of the present invention per se, some uses of the product of the present invention may require an emulsifier. For example, if the present invention is used to stabilize a colorant that is oil soluble, but is being used to color an aqueous beverage mix, it may be necessary to include an emulsifier to ensure that the colorant is dispersed and stays dispersed when the beverage mix is dissolved in water. Particularly useful emulsifiers for the purposes of the present invention include the Polyaldo® Series of polyglycerol esters sold by Lonza Inc. and lecithins like soy lecithin.

While the present invention stabilizes labile materials, some uses for the fixed material may require conventional stabilizers for stabilizing the labile component when the fixed material is utilized in a different system. In those instances, it may be useful to include a conventional anti-oxidant such as vitamin C (i.e., ascorbic acid and its derivatives), vitamin E (topocol and its derivatives), BHT and BHA in conventional amounts. When lipid soluble stabilizers are utilized, they are preferrably incorporated into an admixture with the labile material in an oleaginous (oil-based) media before being added to the substrate ingredients.

Additionally, while the products of the present invention do not tend to clump, in some applications it may be desirable to include a conventional anti-caking agent such as tricalcium phosphate, silicon dioxide, calcium citrate and calcium silicate. When one includes an anti-caking agent with the substrate, in the present invention, it is desired that it is present in an amount of between about 0.5 and 2%. Anti-caking agents may be added to the product of the present invention after extrusion.

The examples set out herein below, are for illustrative purposes only, and are not meant to in any way limit the present invention.

EXAMPLE I

High maltose corn syrup solids (Satin Sweets 65 from Cargill Foods) containing, on a dry basis, about 65% maltose, about 4% dextrose, about 15% maltotriose and about 16% higher saccharides were dry blended in a V-blender™ with an enzyme-converted maltodextrin (Lodex® 10) containing, on a dry basis, less than about 3% monosaccharides, about 2% disaccharides, about 3% trisaccharides, and about 92% tetra- and higher saccharides in a ratio of 4 parts, by weight, high maltose corn syrup solids to each part maltodextrin. This mixture was fed by a K-Tron™ feeder into a heated twin screw extruder (Werner & Pfleiderer C-37) where it formed a homogeneous melt. The extruder had four heating zones, which were set at 40, 60, 70 and 85° C. A purified fish oil was injected into the extruder by a Lewa™ metering pump from a collapsible plastic container at a rate of 11%, by weight of the saccharide mixture, and blended therewith in the extruder to homogeneity. The blend was then forced through about 1 mm apertures in a right angle, brass diehead. The diehead had a temperature of 110° C. as the exudate exited the diehead.

Upon exiting the diehead (in a downward direction), the strands were cooled using a fan. As a result of the cooling, the strands did not touch while hot and fusing was avoided. The strands solidified into long thin spaghetti like strands. Some of these strands were washed with hexane, and those that were so washed had less of a fish oil smell than those strands that were not washed. However, the fish oil smell of the strands that were not washed was only a slight odor.

Both the washed and the unwashed strands were broken into smaller pieces and stored. After a prolonged storage of about 9 months in glass jars at ambient conditions, the fish oil appeared to be stable. When the jars were opened, no off odors were detected.

Microscopic examination of the product of this example revealed oil droplets dispersed in the carbohydrate matrix. The oil cells have a size of about 2 to 20 micrometers in diameter.

Thermal analysis of the product with a differential scanning calorimeter (DSC) determined a $T_g$ of 47.1° C. A thermogravimetric analyzer (TGA) was used to determine weight loss of product upon heating, and was found that 2.5% of its weight was lost between about 32° C. and 130° C. and an additional 1.7% of its weight was lost between about 130° C. and 185° C. A thermomechanical analyzer (TMA) was used to determine that the product's softening profiles included two softening regions, the first beginning at 53.2° C. and ending at 65.9° C. and the second beginning at 81.9° C. and ending at 89.4° C.

EXAMPLE II

Example I was repeated except that the amount of fish oil was reduced to 9% of the weight of the saccharide mixture. Additionally, the temperature zones of the extruder were changed to 40, 60, 75 and 90° C. and the diehead had a temperature of 113.2° C.

EXAMPLE III

Example I was repeated except that the amount of fish oil was reduced to 7% of the weight of the saccharide mixture. Additionally, the temperature zones of the extruder were changed to 40, 60, 75 and 90° C. and the diehead had a temperature of 110.9° C.

EXAMPLE IV

Example I was repeated except that the amount of fish oil was reduced to 5% of the weight of the saccharide mixture. Additionally, the temperature zones of the extruder were changed to 40, 60, 75 and 90° C. and the diehead had a temperature of 111.2° C.

EXAMPLE V

A glass containing 5% β-carotene, by weight, was prepared by blending β-carotene powder (Roche Vitamins and Fine Chemicals, Nutley, N.J. 07110) with Satin Sweet 65 powder (Cargil Foods, Cedar Rapids, Iowa 52406) and Lodex® 10 (American Maize Products Co., Hammond, Ind., 46320) in the ratio of 5:76:19 (by weight), in a V-blender™. The dry powder mix was metered into a W&P (Warner & Pfleiderer) C-37 extruder at the rate of 13.2 lb/hr and subjected to heat and shear energy to produce a homogeneous melt inside the extruder. The melt is then passed through a die to shape it into thin strands (1 mm) which solidify and maintain their structural integrity at room temperature. The strands exhibited a dark orange/red color.

Additionally, when about 1 gram of this product was mixed with about 250 ml cold water, it was substantially uniformly dispersed with stirring within about 30 seconds.

After a prolonged storage of about 9 months at ambient conditions, the product of this example retained its β-carotene red color, indicating that the product had protected the β-carotene from oxidation.

EXAMPLE VI

A glass containing 1% β-carotene, by weight, was prepared by the procedure of Example V except that only 1 part, by weight, of β-carotene was used with 80 parts Satin Sweet 65 and 19 parts Lodex® 10 (parts by weight).

The strands exhibited an orange/red color and the color did not fade with exposure to light in a clear glass container. The starting powder mixture (before extrusion quickly faded under substantially the same exposure conditions.

EXAMPLE VII

A glass containing apo-carotenal (β-apo—8'-carotenal) was prepared by blending apo-carotenal powder (Roche Vitamins and Fine Chemicals, Nutley, N.J. 07110) with Satin Sweet 65 powder and Lodex® 10 in the weight ratio of 1:80:19 in a V-Blender™. The dry powder mix was extruded as in Example V to provide fine strands of the apo-carotenal in a glassy substrate.

EXAMPLE VIII

A glass containing apo-carotenal suspended in oil was prepared using the procedure of Example VII. Starting with apo-carotenal that was suspended at a 20% level in vegetable oil, an emulsifier, polyaldo 10-2-P (decaglyceral dipalmitate from Lonza Speciality Chemicals, Fair Lawn, N.J. 07410) was mixed with the apo-carotenal suspension at the ratio of 8:92 using a high shear mixer to disperse the emulsifier in the apo-carotenal suspension. The resulting carotenal-emulsifier-oil suspension was then blended in a V-blender™ with Satin Sweet 65 powder and Lodex® 10 in the weight ratio of 5.4:75.6:19. This dry blend was then metered in the W&P C-37 extruder to produce fine strands of the vitamin in a glassy carbohydrate carrier.

EXAMPLE IX

Natural maltol was stabilized in a glass prepared by blending natural maltol, Maltrin® 365 (from the Grain Processing Company of Muscatine, Iowa 522361) and Lodex® 10 in the weight ratio of 16.7:41.65:41.65, respectively. The blend was extruded using a 0.25 mm diehead aperture, and the product were collected and stored in a glass jar.

The $T_g$ of this product was 46.8° C. The TGA of this product showed a weight loss of 9.5%, between about 28° C. and 142° C. Based upon the TMA, the product had two softening regions, the first beginning at 53.2° C. and ending at 65.9° and the second beginning at 81.9° C. and the second ending at 89.4° C.

A similar formulation was stored in glass jars under ambient conditions for about 8 years, and the glass rods of that formulation retained approximately all of the maltol initially present in the rods.

EXAMPLE X

Another glass stabilized maltol sample was prepared using natural maltol, Maltrin® 365 and Lodex® 10 in the weight ratio of 23:38.5:38.5, respectively. This product was also very stable.

While the invention has been particularly described in connection with specific embodiments thereof, it is to be understood that this is by way of illustration and not of limitation, and that the scope of the appended claims should be construed as broadly as the prior art will permit.

What we claim is:

1. A method for fixing a labile material in an extruded, glassy, moisture-stable substrate at a level effective to impart a sensory benefit to a food composition comprising the steps of:
   (a) preparing a homogeneous mixture of a substrate without any added moisture, said substrate being comprised of about 50% to 85% by weight of a major component, said major component having a molecular weight of from about 90 to 950 and consisting of water-soluble carbohydrates having a melting point of from about 80° C. to about 190° C., sugar alcohols, adipic acid, citric acid, malic acid and combinations thereof, and from about 15% to 30% by weight of a minor component, said minor component having an average molecular weight above 1,000 and consisting of water-soluble, polymeric, carbohydrate material which contains at least about 90% polymeric carbohydrate material;
   (b) heating said homogeneous, dry-blended mixture within a screw extruder such that the temperature of the mixture in the extruder is between about the glass transition temperature of the substrate and the melting point of the major component, such that the major component and the minor component mix and form a molten mass;
   (c) adding said labile material to said major and minor components; and
   (d) extruding the molten mass through a diehead to produce an amorphous, homogeneous glassy substrate with entrapped labile material, said glassy having a glassy transition temperature above ambient temperature.

2. The method of claim 1 in which said labile material is at least one of the group consisting of omega oils and oxidizable vitamins and co-factors.

3. The method of claim 1 further comprising the step of selecting said water-soluble carbohydrates having a melting point of from about 80° C. to about 190° C. from the group consisting of glucose, maltose, maltotriose and mannose.

4. The method of claim 1 in which said adding said labile material step comprising pumping said labile material into said extruder without a substantial exposure to an oxidizing atmosphere.

5. The method of claim 1 in which said labile material is at least one of the group consisting of oxidizable ingestible colorants and flavorants.

6. The method of claim 1 further comprising the step of cooling said extruded glassy substrate after it emerges from said diehead.

7. The method of claim 6 further comprising the step of metering between about 1 and 50%, on the basis of the weight of said homogeneous dry-blended mixture, of said labile material and blending said metered labile material homogeneously into said homogeneous dry-blended mixture.

8. The method of claim 1 wherein the minor component is high maltose corn syrup solids.

9. The method of claim 8 wherein the major component is 5–20 D.E. maltodextrin.

10. The method of claim 9 wherein the substrate consists of high maltose corn syrup solids and 5–20 D.E. maltodextrin.

* * * * *